(12) United States Patent
Hashiguchi (10) Patent No.: US 9,417,872 B2
(45) Date of Patent: Aug. 16, 2016

(54) RECORDING MEDIUM STORING ADDRESS MANAGEMENT PROGRAM, ADDRESS MANAGEMENT METHOD, AND APPARATUS

(71) Applicant: FUJITSU LIMITED, Kawasaki-shi, Kanagawa (JP)

(72) Inventor: Masafumi Hashiguchi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 13/909,462

(22) Filed: Jun. 4, 2013

(65) Prior Publication Data

US 2014/0006759 A1  Jan. 2, 2014

(30) Foreign Application Priority Data

Jun. 29, 2012  (JP) .................. 2012-147262

(51) Int. Cl.
*G06F 9/45* (2006.01)
*G06F 9/30* (2006.01)
*G06F 9/44* (2006.01)

(52) U.S. Cl.
CPC .......... *G06F 9/30058* (2013.01); *G06F 9/4426* (2013.01)

(58) Field of Classification Search
None
See application file for complete search history.

(56) References Cited

U.S. PATENT DOCUMENTS

| 5,428,786 A * | 6/1995 | Sites .......................... G06F 8/52 717/151 |
| 5,499,379 A * | 3/1996 | Tanaka et al. ................... 710/40 |
| 5,649,203 A * | 7/1997 | Sites .......................... G06F 8/30 717/159 |
| 5,740,447 A * | 4/1998 | Kurahashi .......... G06F 9/44521 717/159 |

(Continued)

FOREIGN PATENT DOCUMENTS

| JP | 58-54449 | 3/1983 |
| JP | 63-62053 | 3/1988 |

(Continued)

OTHER PUBLICATIONS

Gunther, "A High Speed Mechanism for Short Branches"; 1990 ACM; [retrieved on Apr. 5, 2016]; Retrieved from Internet <URL:http://dl.acm.org/citation.cfm?id=121980>; pp. 59-62.*

(Continued)

*Primary Examiner* — Xi D Chen
(74) *Attorney, Agent, or Firm* — Staas & Halsey LLP (57) ABSTRACT

A computer-readable recording medium stores a program for causing an apparatus to execute an address managing process including: associating information that identifies a branch destination routine of a branch instruction with a jump instruction in which a relative address to the branch destination routine, and generating the associated information and jump instruction in a branch destination management entry on a memory; setting a relative address to a position of the jump instruction that corresponds to the information that identifies the branch destination routine of the branch instruction, as a branch destination relative address of the branch instruction; and changing the jump destination of the jump instruction that corresponds to the information that identifies the branch destination routine, to a relative address to a position of the branch destination routine of the movement destination, with reference to the branch destination management entry when the branch destination routine is moved.

12 Claims, 11 Drawing Sheets

(56) References Cited

U.S. PATENT DOCUMENTS

| | | | | |
|---|---|---|---|---|
| 5,764,987 | A * | 6/1998 | Eidt et al. | 717/100 |
| 5,822,787 | A * | 10/1998 | Zucker | G06F 9/4426 711/202 |
| 5,991,871 | A * | 11/1999 | Zucker | G06F 9/4426 711/E12.068 |
| 6,079,015 | A * | 6/2000 | Harwood et al. | 712/244 |
| 6,091,897 | A * | 7/2000 | Yates et al. | 717/138 |
| 6,286,088 | B1 * | 9/2001 | Campbell et al. | 711/165 |
| 6,609,248 | B1 * | 8/2003 | Srivastava | G06F 8/447 717/148 |
| 6,662,354 | B1 * | 12/2003 | Krablin | G06F 8/433 717/151 |
| 6,763,327 | B1 * | 7/2004 | Songer | G06F 9/45504 717/151 |
| 6,851,110 | B2 * | 2/2005 | Hundt et al. | 717/159 |
| 6,976,250 | B2 * | 12/2005 | Takayama | G06F 9/30149 717/151 |
| 7,036,116 | B2 * | 4/2006 | Haber et al. | 717/151 |
| 7,171,655 | B2 * | 1/2007 | Gordon | G06F 9/44589 717/148 |
| 7,254,806 | B1 * | 8/2007 | Yates et al. | 717/136 |
| 8,132,002 | B2 * | 3/2012 | Lo | G06F 9/4812 717/159 |
| 8,239,848 | B2 * | 8/2012 | Ghercioiu et al. | 717/162 |
| 8,499,293 | B1 * | 7/2013 | Ashcraft | G06F 8/441 717/151 |
| 8,943,486 | B2 * | 1/2015 | de Jong | G06F 9/30189 717/159 |
| 9,015,027 | B2 * | 4/2015 | North | G06F 9/45516 717/148 |
| 2002/0073407 | A1 * | 6/2002 | Takayama | G06F 9/30149 717/159 |
| 2003/0191792 | A1 * | 10/2003 | Waki | G06F 9/30156 717/148 |
| 2004/0168028 | A1 | 8/2004 | Cierniak | |
| 2005/0144608 | A1 * | 6/2005 | Oyama et al. | 717/162 |
| 2005/0188171 | A1 * | 8/2005 | McIntosh | 711/200 |
| 2006/0026577 | A1 * | 2/2006 | Dinechin et al. | 717/148 |
| 2008/0301256 | A1 * | 12/2008 | McWilliams et al. | 709/214 |
| 2009/0198897 | A1 * | 8/2009 | Arimilli et al. | 711/122 |
| 2009/0217009 | A1 * | 8/2009 | Shum et al. | 712/226 |
| 2012/0265946 | A1 * | 10/2012 | Branton | 711/154 |
| 2015/0178054 | A1 * | 6/2015 | Delsart | G06F 8/30 717/148 |

FOREIGN PATENT DOCUMENTS

| | | |
|---|---|---|
| JP | 63-168725 | 7/1988 |
| JP | 2000-181723 | 6/2000 |
| JP | 2005-284729 | 10/2005 |
| JP | 2006-521597 | 9/2006 |

OTHER PUBLICATIONS

Dalrymple, "A Parametric Associative Memory Emulation"; 1975 ACM; [retrieved on Apr. 5, 2016]; Retrieved from Internet <URL:http://dl.acm.org/citation.cfm?id=1217182>;pp. 10-36.*

Tian, et al., "An Algorithm of Program Structure Adjustment Base on Interactive Disassembly"; 2011 IEEE; [retrieved on Apr. 5, 2016]; Retrieved from Internet <URL:http://ieeexplore.ieee.org/stamp/stamp.jsp?tp=&arnumber=5982476>; pp. 860-863.*

Farooq, et al., "Value Based BTB Indexing fro Indirect Jump Prediction"; 2009 IEEE;[retrieved on Apr. 5, 2016]; Retrieved from Internet <URL:http://ieeexplore.ieee.org/stamp/stamp.jsp?tp=&arnumber=5416659>; pp. 1-11.*

Office Action issued by the Japanese Patent Office on Dec. 22, 2015 in corresponding Japanese patent application No. 2012-147262.

* cited by examiner

RECORDING MEDIUM STORING ADDRESS MANAGEMENT PROGRAM, ADDRESS MANAGEMENT METHOD, AND APPARATUS

CROSS-REFERENCE TO RELATED APPLICATION

This application is based upon and claims the benefit of priority from the prior Japanese Patent Application No. 2012-147262 filed on Jun. 29, 2012, the entire contents of which are incorporated herein by reference.

FIELD

The embodiments discussed herein are related to a recording medium storing a program that manages a branch address in computer software, an address management method, and an apparatus.

BACKGROUND

A program in a computer system operates when a processor processes a routine that is written in machine language. One or more codes written in the machine language are herein referred to as "routines".

Instructions included in the routine are processed by a processor in order one by one. However, a routine in most programs includes an instruction that changes one instruction to be processed next, to an instruction other than the one instruction, or to an instruction in another routine, depending on a condition. Such an instruction that changes an address of an instruction to be processed next is generally called a "branch instruction".

Figure 1:
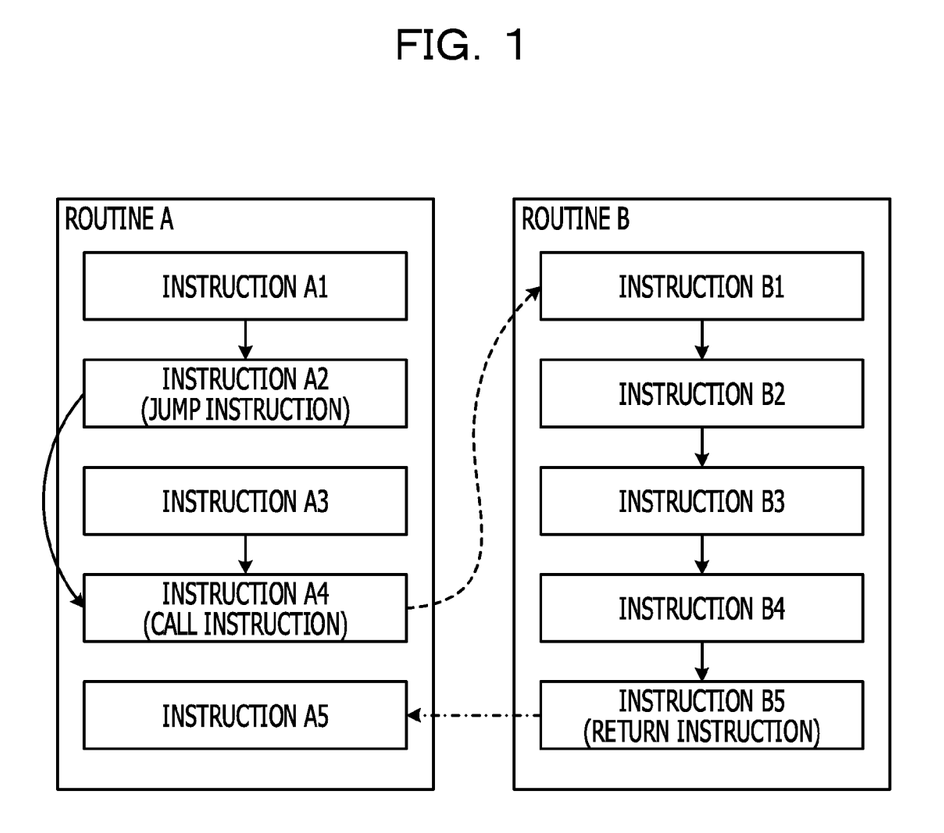
FIG. 1 is a diagram illustrating a process by a branch instruction.

FIG. 1 illustrates an example in which the order of processes is changed by a branch instruction. The name of a branch instruction and a code of an instruction vary depending on a processor. In an instruction set for a common processor, there are a jump instruction and a call and return instruction as the branch instruction. The call and return instruction may be divided into a call instruction and a return instruction. Hereinafter, the branch instruction is used as a term that collectively refers to the jump instruction, the call and return instructions, or the like.

As illustrated in FIG. 1, when an instruction A2 is a jump instruction, instead of an instruction A3 next to the instruction A2, an instruction A4 may be set as an instruction to be processed after the instruction A2. In addition, when the instruction A4 is a call instruction to call a routine B, the process proceeds to an instruction B1 in the routine B after execution of the instruction A4. After that, instructions B2 to B4 in the routine B are processed in order. In addition, when an instruction B5 is a return instruction, the process returns to an instruction A5 next to the instruction A4 in the routine A. The call instruction is used with the return instruction. When the return instruction is executed, a stack pointer is, for example, set up in order to hold a return address. Generally, the jump instruction is often used to branch in the same routine, and the call and return instructions are often used to branch to an instruction in another routine.

An individual instruction in a routine mainly includes an "operation code" that indicates the type of the instruction and an "operand" that indicates a value that is a calculation target of the instruction. Each operand of the jump instruction and the call instruction stores an address in which an instruction of the branch destination exists. In most cases, the address is represented by a relative address from the instruction of the branch source.

An address that is used in the embodiments may be a virtual address or may be a real address. In addition, in the embodiments, Java (registered trademark) may be used as an example, however, the embodiment is not limited to the use of Java.

A program that is written in Java is converted into byte code. The byte code is executed by a Java virtual machine (Java VM). Therefore, the program that is written in Java operates regardless of CPU as long as the computer supports the Java VM. Thus, Java has an advantage of operating in multiple platforms. A common Java VM sequentially converts "byte code" into machine language that is specific to a processor, and causes the processor to process the machine language. However, in the sequential conversion of the byte code, the processing costs often increase.

Therefore, there is a technology to convert byte code into a routine of the machine language, for each method, during program execution. Such technology is generally called "Just in time (JIT) compilation".

Figure 2:
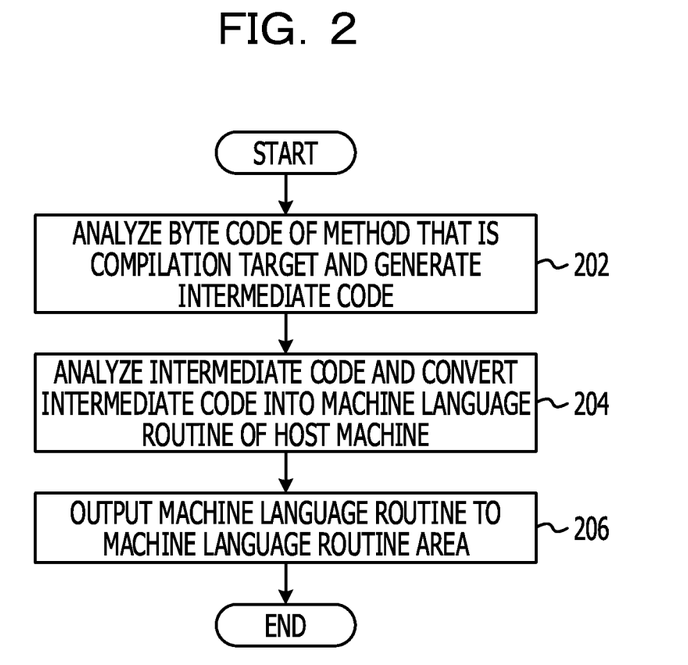
FIG. 2 is a diagram illustrating a process of a common JIT compiler.

FIG. 2 illustrates a process of a common JIT compiler. In Step 202, the JIT compiler converts a byte code of a method, which is a compilation target, into an intermediate code that is independent of a host machine. In Step 204, the JIT compiler converts the intermediate code into a machine language routine of the host machine. In Step 206, the machine language routine is written in a machine language routine area on a memory. As a result, all of the compiled methods are represented by the machine language routine that is specific to a processor, so that the processor may process the machine language routine directly. Hereinafter, a memory area to store a machine language routine that is generated by the JIT compiler is referred to as a "routine area".

When the process of the program proceeds, a routine that is not used may occur, so that the routine area varies with time. That is, the number of routines and usage of the memory vary. The unused routine is open for another routine by executing garbage collection. However, there is a problem such as occurrence of fragments when the garbage collection is simply executed.

Figure 3:
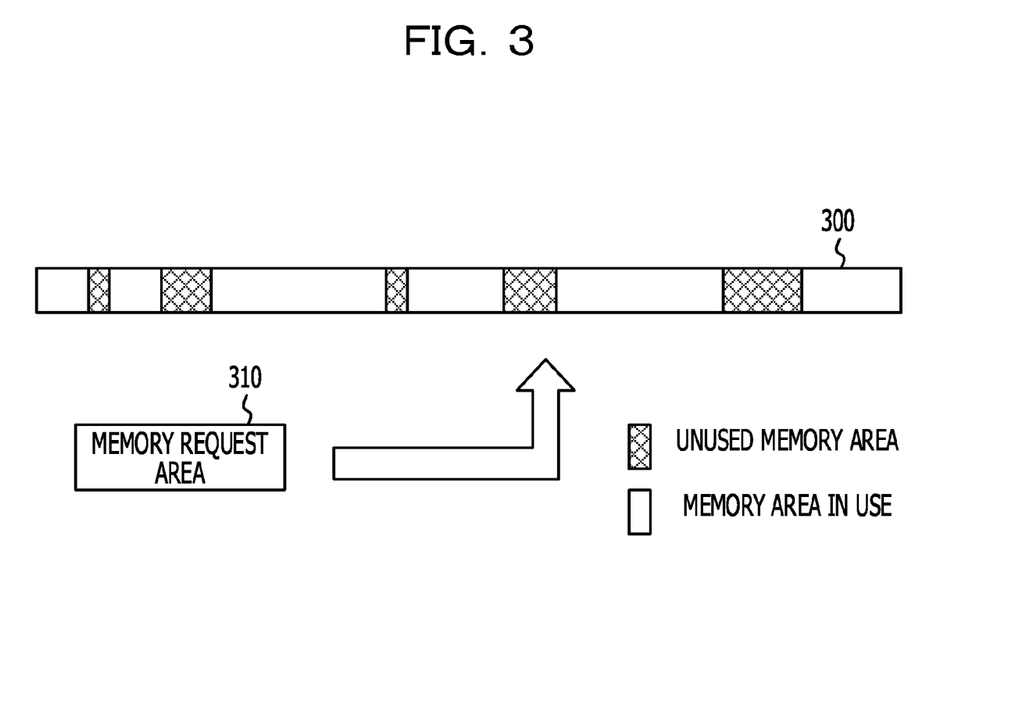
FIG. 3 is a diagram illustrating occurrence of fragments on a memory.

FIG. 3 illustrates the occurrence of fragments on the memory. A routine of methods includes a branch instruction in most cases. In a case in which an operand that indicates the branch destination is a relative address, when the routine that includes the branch instruction is simply moved, the branch instruction is issued to a wrong branch destination, undesirably. In addition, the above-described case is also applied to a case in which the branch destination is moved. Therefore, even when the unused routine increases and free spaces appear in the routine area, it is difficult to move the routine and collects the free memory areas. Therefore, the fragments remain.

Even when a virtual memory is used, the size of the routine area is limited. This is because the virtual memory area is not unlimited. Thus, the fragments may remain and weigh on the virtual memory resource even in the virtual memory space.

As a technology to defragment the memory area, there is compaction-type garbage collection to collect free memory areas. However, as described above, a routine that branches using a relative address is not allowed to be moved. Therefore, it is difficult to apply the compaction-type garbage collection for the routine area.

The minimum unit of the JIT compilation is a sub-routine that is called a method. When fragments occur, for example, a memory area that is used for a routine compiled by the JIT compiler might not be allocated because the size of the individual free memory areas is small even in a situation in which there is an enough room when all free memory areas are combined. When a memory is not allocated to a routine area, an application may terminate. In order to avoid such termination, the JIT compiler may stop compiling the method at the time. Alternatively, an optimization level of the JIT compiler may be reduced and the operation is switched to compilation that consumes a smaller memory area.

In the related art, a technology is discussed in which unauthorized memory access during memory compaction is avoided by starting garbage collection while blocking a user program by an I/O process or the like, and ending the I/O blocking before the garbage collection ends to restart the user program. Japanese Laid-open Patent Publication No. 2000-181723 is an example of the related art.

In addition, in the related art, a technology is discussed in which whether or not a method, on which the JIT compilation is performed, is allowed to be executed without generating a frame (area to store a local variable) is determined, a native code that is executed without generating a frame is generated for such a method, and a call of the method is streamlined. Japanese Laid-open Patent Publication No. 2005-284729 is an example of the related art.

SUMMARY

According to an aspect of the invention, a computer-readable recording medium storing a program for causing an apparatus to execute an address managing process. The address managing process includes: associating information that identifies a branch destination routine of a branch instruction with a jump instruction in which a relative address to the branch destination routine is set as a jump destination, and generating the associated information and jump instruction in a branch destination management entry on a memory; setting a relative address to a position of the jump instruction that corresponds to the information that identifies the branch destination routine of the branch instruction, as a branch destination relative address of the branch instruction; and changing the jump destination of the jump instruction that corresponds to the information that identifies the branch destination routine, to a relative address to a position of the branch destination routine of the movement destination, with reference to the branch destination management entry when the branch destination routine is moved.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments are described in detail below with reference to drawings. In order to facilitate the understanding of the disclosure, the embodiments are described below, and the scope of the present disclosure is not limited to the embodiments. In addition, the embodiments described below are not mutually exclusive. Thus, it is intended that elements of the embodiments are combined to each other unless there is a conflict. In addition, in the method and the program according to the disclosure, order of the processes may be changed unless there is a conflict, and alternatively, the processes may be executed at the same time. Such embodiments are also included in the technical scope of the disclosure.

Functions of the embodiments described below are realized by executing a program code that is read by a computer. In addition, another program such as an OS that operates on the computer may execute a part or all of actual processes on the basis of an instruction of the program code, thereby realizing the functions of the embodiments by such processes.

In the embodiments, it is assumed that the JIT compilation is performed in units of a method. In addition, in the embodiments, a set of pieces of machine language that is obtained by performing the JIT compilation on methods is referred to as a routine. The embodiments are not limited to these cases.

Figure 4:
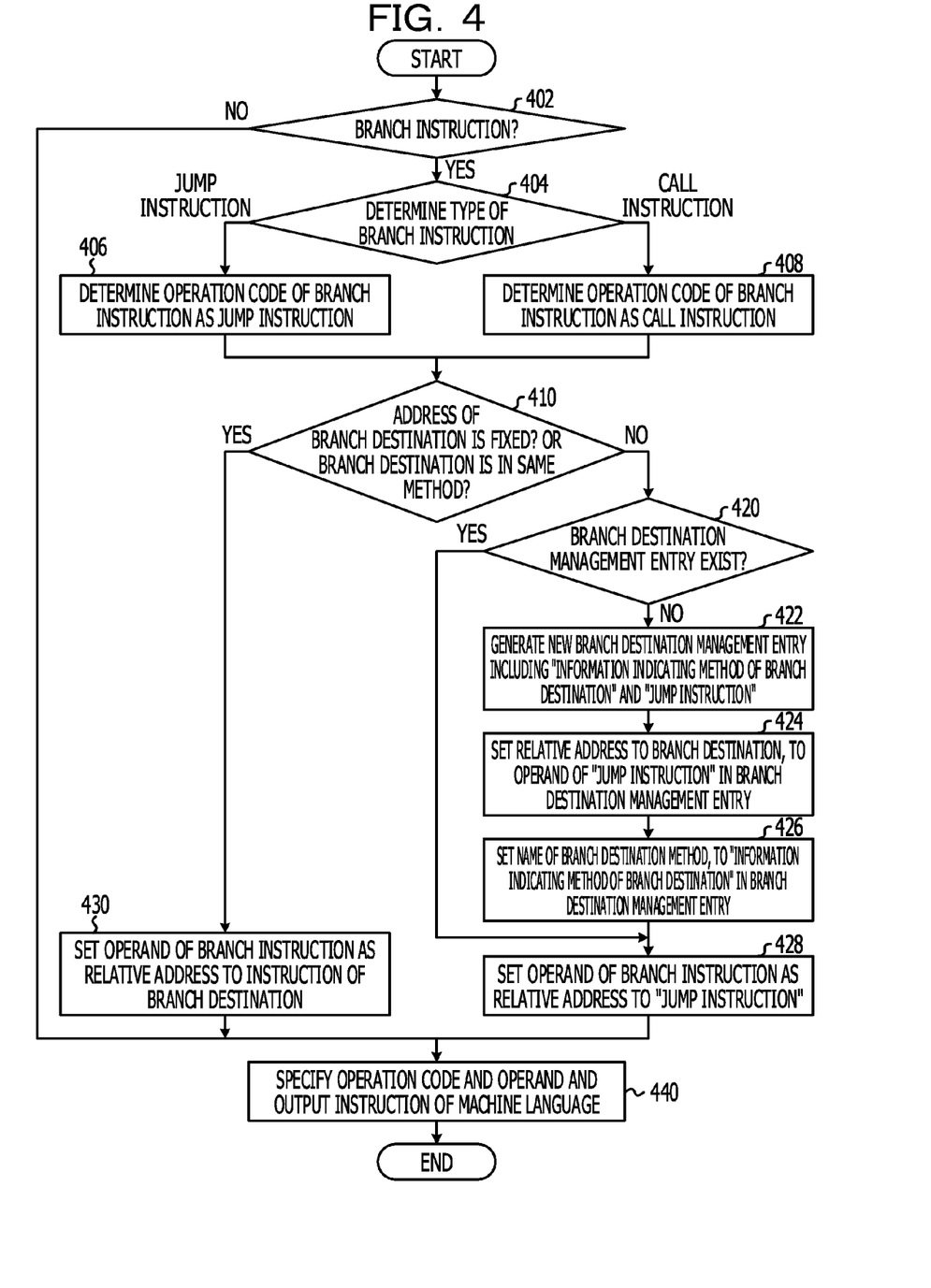
FIG. 4 is a diagram illustrating a process of JIT compilation according to an embodiment.

FIG. 4 is a diagram illustrating a process of the JIT compilation according to an embodiment. In JIT compilation processes, processes loosely related to the embodiments are omitted in order to facilitate the understanding.

In the embodiments, the process illustrated in FIG. 4 is described as the process in the JIT compilation. However, a part of or all of the process may be executed after the JIT compilation has completed and a machine language routine has been generated. In the embodiments, the process may be executed in the JIT compilation and may not be executed in the JIT compilation.

In Step 402, it is checked whether or not an instruction code to be compiled is a branch instruction. When the instruction code is not a branch instruction, the process proceeds to Step 440. When the instruction code is a branch instruction, the process proceeds to Step 404.

In Step 440, an operand and an operation code of machine language are specified, and an instruction of the machine language is output.

In Step 404, the type of the branch instruction is determined. When the branch instruction is a jump instruction, the process proceeds to Step 406. When the branch instruction is a call instruction, the process proceeds to Step 408.

In Step 406, the operation code of the machine language to be generated is determined as the jump instruction.

In Step 408, the operation code of the machine language to be generated is determined as the call instruction.

In Step 410, it is determined whether or not an address of the branch destination is fixed, or whether or not the branch destination is in the same method. When a routine of the branch destination is coded, for example, by C language or the like, and is statically compiled machine language (when the routine of the branch destination is not moved), a "branch destination management entry" that is described later may not be generated. When the branch destination is in the same method, the "branch destination management entry" that is described later may not be generated. When the determination result in Step 410 is "Yes", the process proceeds to Step 430. When the determination result is "No", that is, when the branch destination address is not fixed and is an address in a method other than the same method, the process proceeds to Step 420.

In Step 430, the operand of the branch instruction is set as a relative address to an instruction of the branch destination. That is, a difference between an address in which the instruction of the branch destination is located and an address in which the branch instruction is located may be stored in the operand.

In Step 420, it is checked whether or not the branch destination management entry exists. The branch destination management entry includes information to identify a branch destination and a newly generated jump instruction. As the information to identify a branch destination, for example, a method name of the branch destination may be employed, and alternatively, an address of the branch destination may be used. In the newly generated jump instruction, a jump destination may be replaced in accordance with movement of a routine of the branch destination when the routine of the branch destination is moved on the memory. Therefore, the generated jump instruction may jump to the moved branch destination. When the branch destination management entry exists, the process proceeds to Step 428. When the branch destination management entry does not exist, the process proceeds to Step 422. In order to determine whether or not the branch destination entry exists, whether or not both of the information to identify a branch destination and the newly generated jump instruction exist may be checked. Alternatively, when the branch destination management entry may be uniquely identified merely using the information to identify the branch destination, the mere information to identify the branch destination may be checked. For example, when a plurality of jump destinations may exist in a single routine and the information to identify the branch destination is the name of the routine, it is desirable that both of the information to identify the branch destination (the name of the routine) and a branch destination relative address in the operand of the jump instruction are checked. Alternatively, when an absolute address of the branch destination is used as the information to identify the branch destination, the mere information to identify the branch destination (the absolute address of the branch destination) may be checked. When the absolute address of the branch destination is used as the information to identify the branch destination, the information to identify the branch destination (the absolute address of the branch destination) of the branch destination management entry is rewritten in accordance with the movement of the branch destination.

In Step 422, a new branch destination management entry is generated. As described above, the branch destination management entry includes "information that indicates a method of a branch destination" and a "jump instruction".

In Step 424, a relative address to the branch destination is set to the operand of a "jump instruction" of the branch destination management entry. By such setting, the generated "jump instruction" may jump to the branch destination.

In Step 426, the name of the branch destination method is set to "information that indicates a method of a branch destination" of the branch destination management entry. The information that is stored in the "information that indicates a method of a branch destination" is not limited to the name of the branch destination method. As long as the branch destination method is identified, any information may be employed. For example, an absolute address of the branch destination of the routine in which a branch destination method is compiled may be employed.

In Step 428, the operand of the machine language of the branch instruction is set as a relative address to the generated "jump instruction". By such process, the branch instruction may jump to the generated "jump instruction". By executing such process, the branch instruction may proceed to an instruction of a target branch destination through the generated "jump instruction".

In the generated "jump instruction", there is no operation such as change of the stack pointer, so that the process may return to the branch source method when a return instruction is executed in a branch destination method even in a case in which an instruction of the branch source is a call instruction.

In Step 440, an operation code and an operand are specified, and an instruction of the machine language is output.

Figure 5:
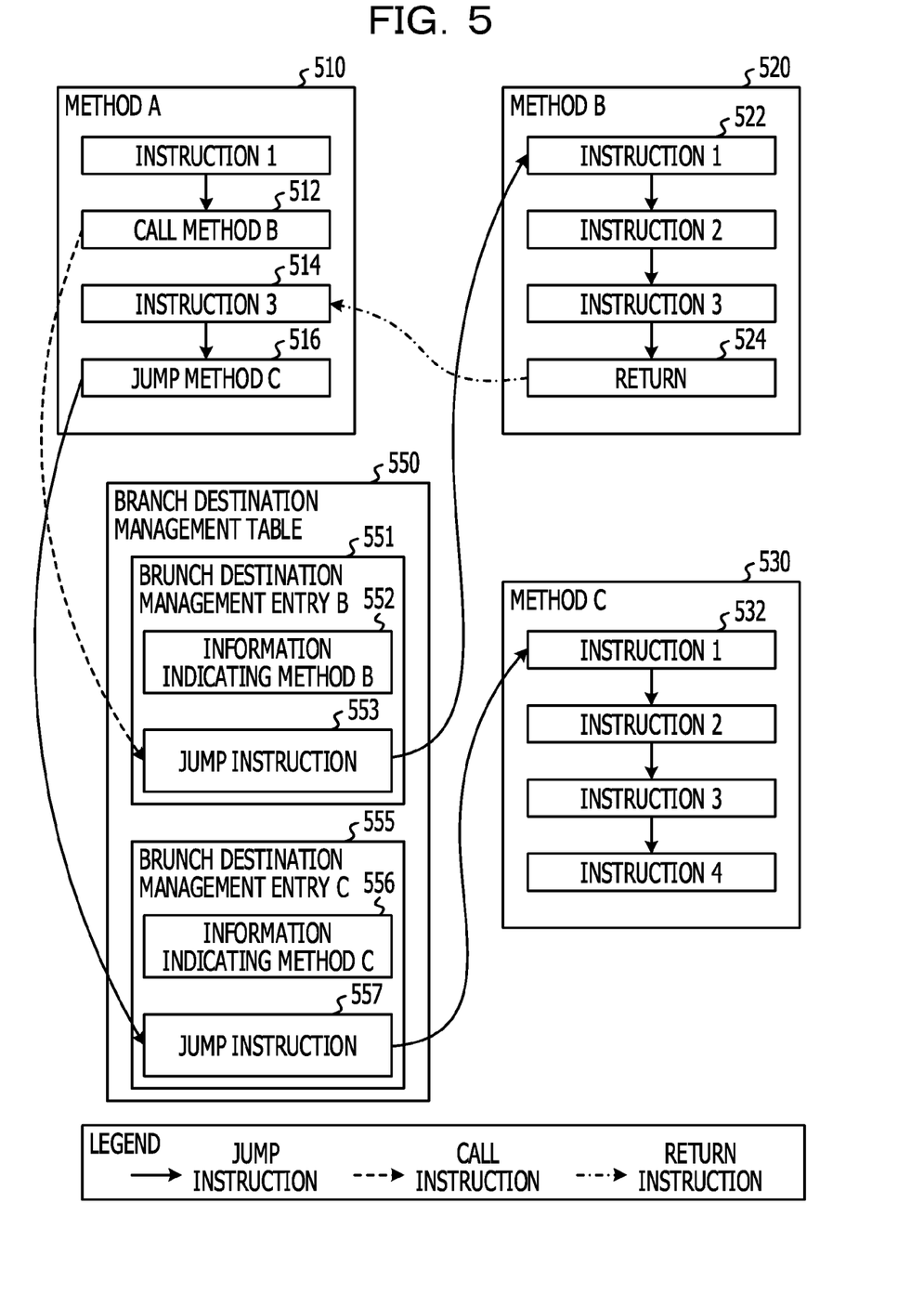
FIG. 5 is a diagram illustrating a branch using a branch destination management entry that is stored in a branch destination management table according to the embodiment.

FIG. 5 is a diagram illustrating a branch using the branch destination management entry that is stored in a branch destination management table according to the embodiment.

In a method A (510), an instruction of a CALL method B (512) is an instruction to call a method B. The instruction might not call the method B directly. That is, the process proceeds to a jump instruction 553 that exists in a branch destination management entry B (551) in a branch destination management table 550. An instruction 1 (522) in the method B (520) is called through the jump instruction 553. In addition, due to a return instruction RETURN (524), the process returns to an instruction 3 (514) in the method A (510).

In FIG. 5, when a jump instruction JUMP method C (516) in the method A (510) is executed, the process may jump to an instruction 1 (532) in a method C (530) through a jump instruction 557 that exists in a branch destination management entry C (555) in the branch destination management table 550.

As described above, the call instruction and the jump instruction cause a process to proceed to a branch destination through a jump instruction that exists in a branch destination management entry in the branch destination management table 550.

In addition, referring to FIG. 5, in the branch destination management entry B, there exists information 552 that indicates the method B that is a branch destination. In addition, in the branch destination management entry C, there exists information 556 that indicates the method C that is a branch destination. The information 552 and the information 556 are used when the branch destination is moved. The detail of the process when the branch destination is moved is described later.

Figure 6:
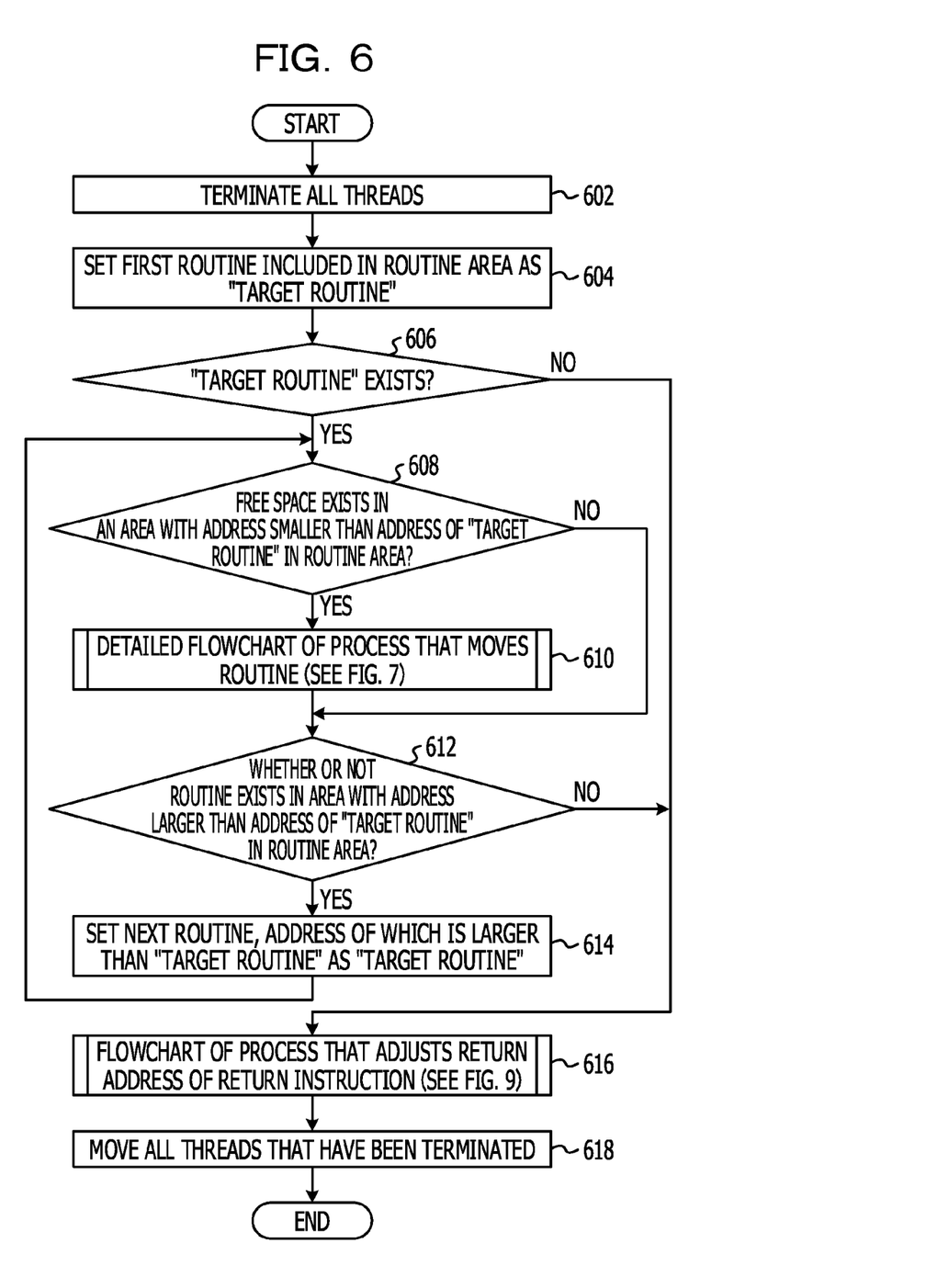
FIG. 6 is a flowchart illustrating the overview of a process that moves a routine, according to the embodiment.

FIG. 6 is a flowchart illustrating the overview of a process that moves a routine, according to the embodiment. Here, an example of the process is illustrated in which one or more routines are moved to increase a successive free memory area.

In Step 602, all threads are terminated. When a thread is moved, it is probable that a new routine is dynamically generated in a memory area. Thus, it is desirable that all of the threads are terminated when such a process is executed.

In Step 604, a first routine included in the routine area is set as a "target routine". The process is a process that first identifies a routine currently focused so as to process the one or more routines in order from the first routine.

In Step 606, it is checked whether or not a "target routine" exists. When the determination result is "No", the process proceeds to Step 616. When the determination result is "Yes", the process proceeds to Step 608.

In Step 608, it is checked whether or not a free space exists in an area with an address smaller than the address of the "target routine" in the routine area. When the determination result is "No", the process proceeds to Step 612. When the determination result is "Yes", the process proceeds to Step 610. When the determination result is "Yes", it is indicated that the free space exists in the area with the address, which is smaller than the address of the "target routine", and the free space may be used when the target routine is moved in a direction to the area with the address, which is smaller than the address of the "target routine".

Figure 7:
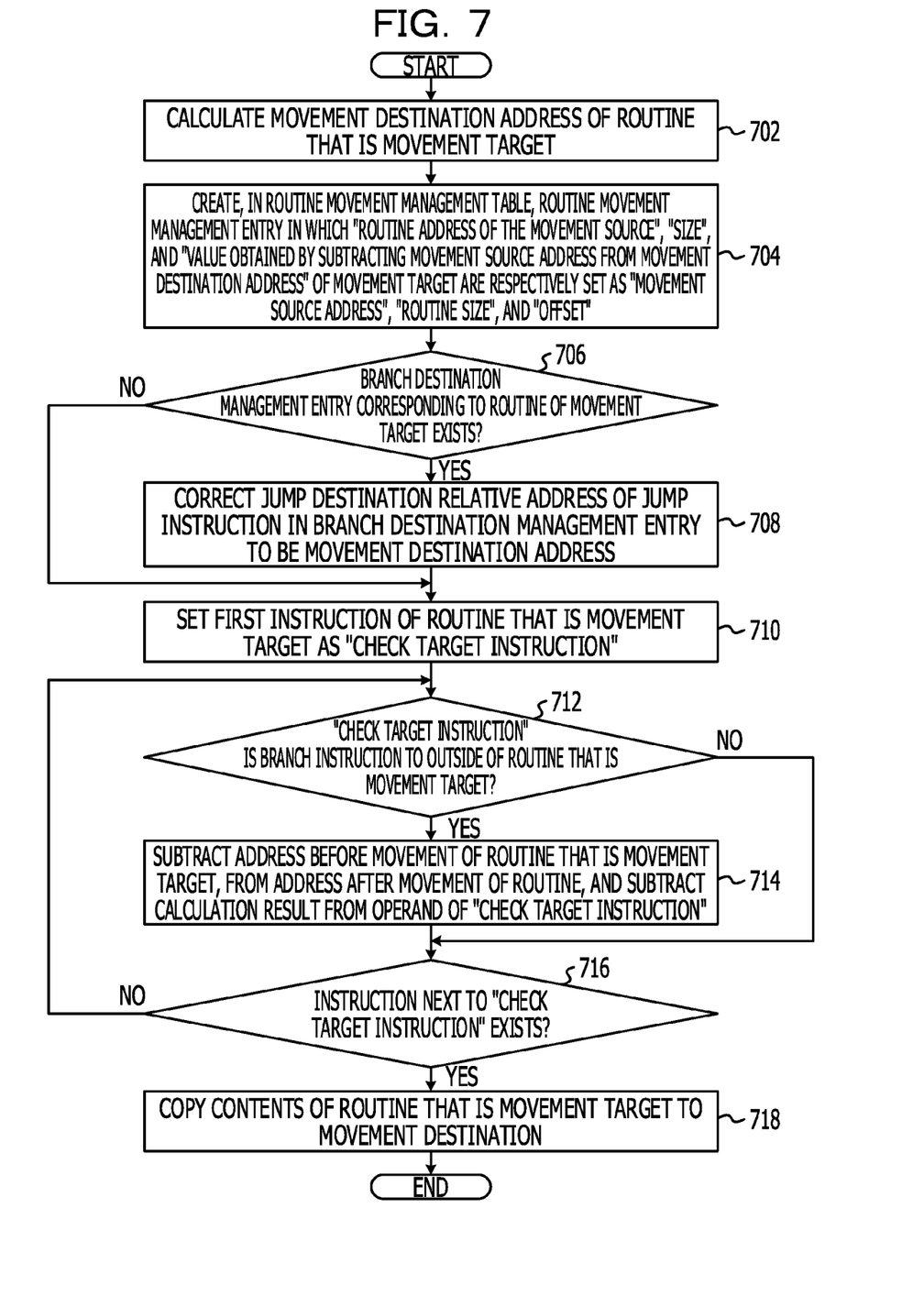
FIG. 7 is a flowchart illustrating the detail of the process that moves the routine, according to the embodiment.

In Step 610, the movement of the routine is executed. The process is described later with reference to the detailed flowchart of the process that moves the routine (FIG. 7).

In Step 612, it is determined whether or not a routine exists in an area with an address larger than the address of the "target routine" in the routine area. When the determination result is "No", the process proceeds to Step 616. When the determination result is "Yes", the process proceeds to Step 614.

In Step 614, a next routine the address of which is larger than the "target routine" is set as a "target routine". By such a process, a routine to be moved next is identified as a focused routine. The process then returns to Step 608.

Figure 9:
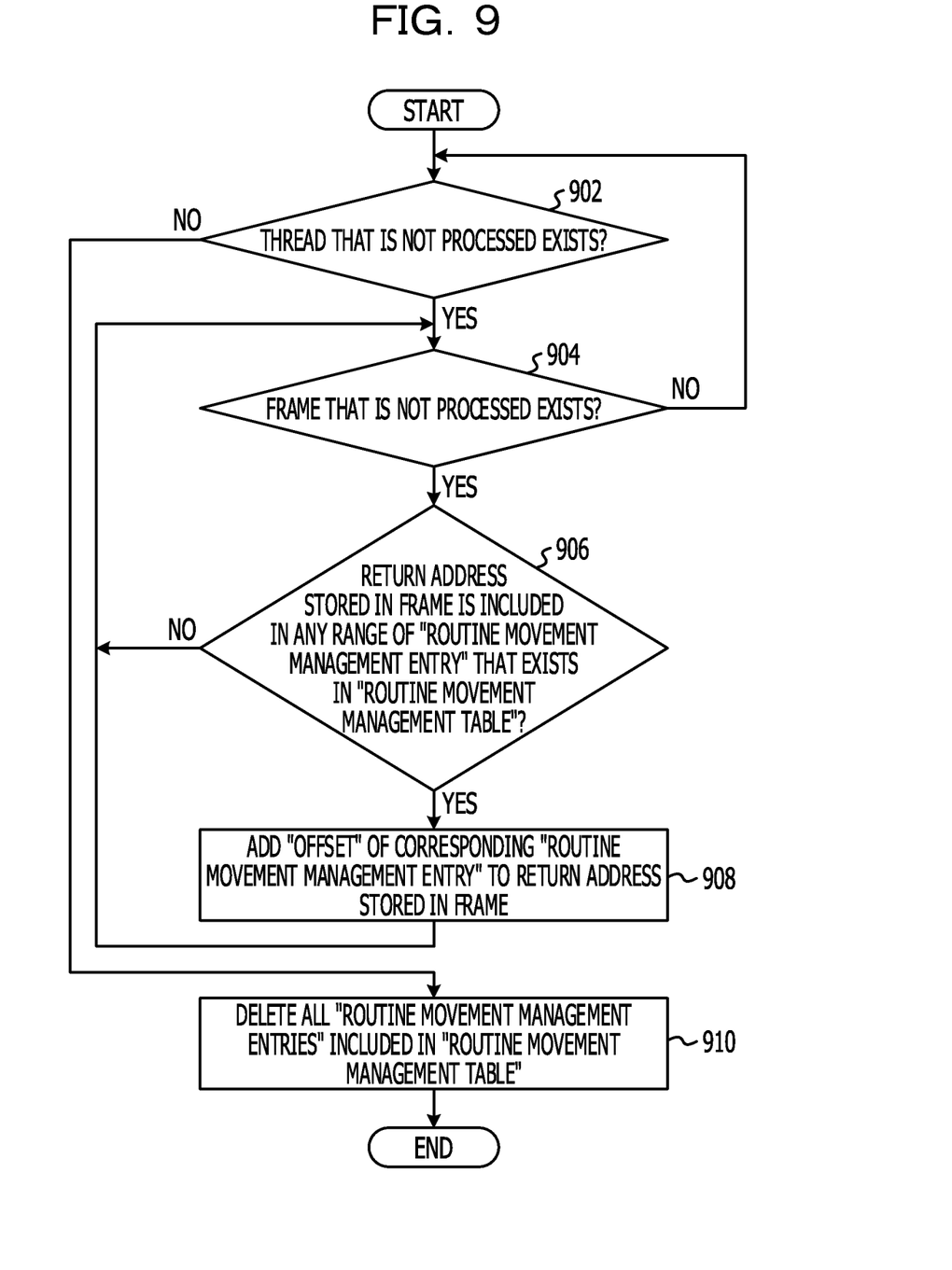
FIG. 9 is a flowchart illustrating a return address adjustment process of a return instruction, according to the embodiment.

In Step 616, a process is executed for a case in which a return instruction that corresponds to a call instruction is executed and all of the threads are terminated before the return instruction is executed. That is, in the series of processes, it is probable that a return destination of the return instruction is moved. In this case, a process that adjusts a return address of the return instruction is executed so that the return operation is appropriately performed. The detail of the process is described later with reference to a flowchart of the process that adjusts the return address of the return instruction (FIG. 9).

In Step 618, all of the threads that have been terminated are moved. By the above-described process, one or more routines are moved, and a successive free memory area is increased, so that the fragmentation of the memory may be removed.

FIG. 7 is a flowchart illustrating the detail of the process that moves a routine, according to the embodiment.

In Step 702, a movement destination address of a routine that is a movement target is calculated. In such calculation, the movement destination address may be determined so that the routine is moved by the size of the free area that exists in an area with the small address.

In Step 704, it is desirable to create a routine movement management entry in a routine movement management table. In the routine movement management entry, "routine address of the movement source", "size", and "value obtained by subtracting a movement source address from the movement destination address" of the movement target are respectively set as "movement source address", "routine size", and "offset". The information is created when the call instruction is executed and all of the threads are terminated in Step 602 before the return instruction is executed, so as to store information that is used to adjust the return address when the return address is moved due to the movement of the routine of the return destination. The detail of the process using such information is described later.

In Step 706, it is determined whether or not a branch destination management entry that corresponds to the routine that is a movement target exists. When the determination result is "No", the process proceeds to Step 710. When the determination result is "Yes", the process proceeds to Step 708.

In Step 708, a jump destination relative address of the jump instruction in the branch destination management entry is corrected to be the movement destination address. The existence of the branch destination management entry indicates that a routine to be moved is a routine that is a target branched from another routine by the jump instruction or the call instruction. Thus, the jump destination of the jump instruction that exists in the branch destination management entry is adjusted in accordance with the movement of the routine.

In Step 710, the first instruction of the routine that is a movement target is referred to as a "check target instruction". By such a process, the first instruction of the routine is first identified as a focused instruction in the routine.

In Step 712, it is determined whether or not a "check target instruction" is a branch instruction to the outside of the routine that is a movement target. When the determination result is "No", the process proceeds to Step 716. When the "check target instruction" is a branch instruction to an address within the routine that is a movement target, it is not desired to correct address information in the operand of the branch instruction. When the determination result is "Yes", the process proceeds to Step 714.

In Step 714, a process is executed in which the movement source address of the routine that is a movement target is subtracted from a movement destination address of the routine, and the calculation result is subtracted from the operand of the "check target instruction". In the process, a relative address stored in the operand of the "check target instruction" is adjusted so that the operand corresponds to the jump instruction of the branch destination management entry.

In Step 716, it is determined whether or not there exists an instruction next to the "check target instruction". When the determination result is "No", the process proceeds to Step 718. When the determination result is "Yes", the process returns to Step 712.

By the above-described process, when the branch destination management entry exists, a jump destination of the corresponding jump instruction is adjusted to be an address of the movement destination of the movement target routine. In addition, contents of operands of all branch instructions that exist in the movement target routine are appropriately adjusted to correspond to an address in which the jump instruction of the branch destination management entry exists.

In Step 718, a process is executed in which contents of the routine that is a movement target are copied to the movement destination.

Figure 8:
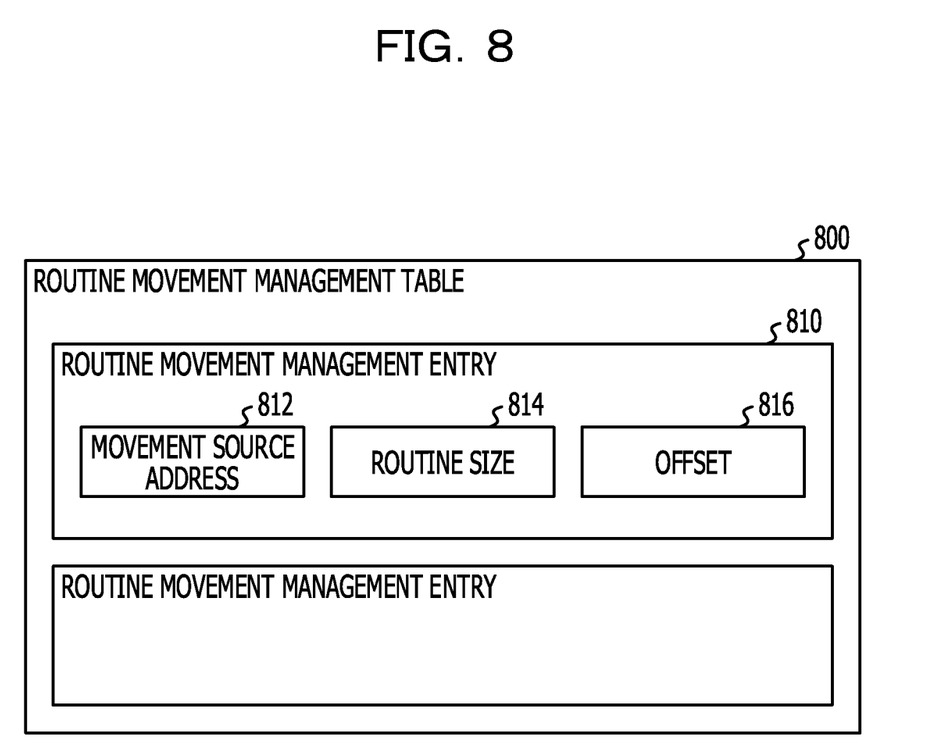
FIG. 8 is a diagram illustrating a routine movement management table according to the embodiment.

FIG. 8 is a diagram illustrating a routine movement management table according to the embodiment. A routine movement management table 800 includes a routine movement management entry 810. The routine movement management entry 810 includes a routine address 812 of the movement source, a routine size 814, and an offset 816 that is an address movement amount of the routine. The routine address 812 of the movement source may be, for example, a first address of the routine. A range of the address that the routine has occupied before movement is found out from the routine address 812 of the movement source and the routine size 814. When such a range of the address includes a return address of the return instruction, the return address is adjusted on the basis of the offset value. Even when a routine of a return destination is moved, the return instruction is appropriately executed by the adjustment of the return address.

FIG. 9 is a flowchart illustrating the process that adjusts the return address of the return instruction, according to the embodiment.

In Step 902, it is determined whether or not a thread that is not processed exists. It is probable that, for a thread that is in the middle of processing when all of the threads are terminated, the return instruction is not executed after execution of the call instruction. When the determination result is "No", the process proceeds to Step 910. When the determination result is "Yes", the process proceeds to Step 904.

In Step 904, it is determined whether or not a frame that is not processed exists. In Java, the call and return instructions are managed in a stack for each thread, and information about the stack is treated in units of a frame. Thus, when a frame exists, it is found that the return instruction has not been executed. When the determination result is "No", the process returns to Step 902, and the other threads are checked. When the determination result is "Yes", the process proceeds to Step 906.

In Step 906, it is determined whether or not a return address that is stored in the frame is included in any range of a "routine movement management entry" that exists in the "routine movement management table". That is, it is determined whether or not the return address is in an address range in which the routine of the movement source exists. When the determination result is "No", the return address might not be adjusted. Therefore, the process returns to Step 904, and the other frames are checked. When the determination result is "Yes", the process proceeds to Step 908.

In Step 908, an "offset" of the corresponding "routine movement management entry" is added to the return address that is stored in the frame. By such a process, the return address is corrected to an address of the routine of the movement destination, so that the return address is adjusted appropriately.

In Step 910, all "routine movement management entries" that are included in the "routine movement management table" are deleted. The deletion is executed because adjustment of all return addresses is completed and information about all of "routine movement management entries" that are included in the "routine movement management table" is not used. In addition, in order to execute a process that moves a new routine appropriately, it is desirable to remove such information.

Figure 10:
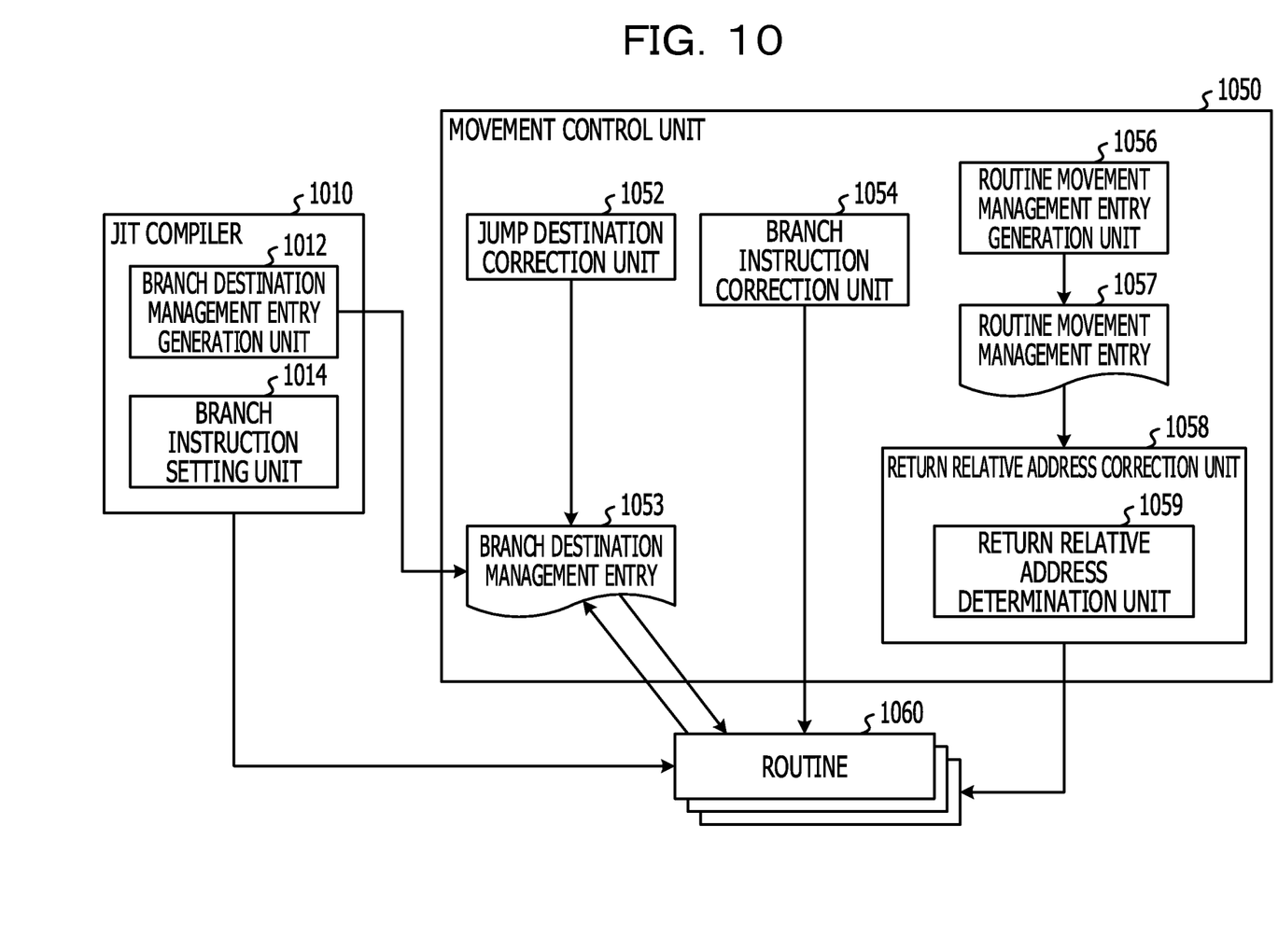
FIG. 10 is a functional block diagram according to the embodiment.

FIG. 10 is a functional block diagram according to the embodiment.

The functional block diagram according to the embodiment illustrated in FIG. 10 includes a JIT compiler 1010, a movement control unit 1050, and one or more routines 1060. The JIT compiler 1010 includes a branch destination management entry generation unit 1012 and a branch instruction setting unit 1014. The branch destination management entry generation unit 1012 may generate, for example, a branch destination management entry 1053. When the branch destination management entry 1053 already exists, the same entry might not be created. Two or more branch instructions that indicate the same branch destination may share one branch destination management entry as long as the one branch destination management entry exists.

The branch instruction setting unit 1014 stores an address in which the jump instruction 553 exists, in an operand of a branch instruction on which the JIT compilation is performed. Therefore, the branch instruction on which the JIT compilation is performed may be branched, for example, to the method B (520) through the jump instruction 553 in the branch destination management entry B (551) in FIG. 5.

In FIG. 10, the movement control unit 1050 includes a jump destination correction unit 1052, a branch instruction correction unit 1054, a routine movement management entry generation unit 1056, a return relative address correction unit 1058, and a return relative address determination unit 1059.

The jump destination correction unit 1052 corrects an operand of a jump instruction in the branch destination management entry 1053 when the routine of the branch destination is moved.

The branch instruction correction unit 1054 corrects an operand of a branch instruction when the branch instruction is moved.

The routine movement management entry generation unit 1056 generates the routine movement management entry 1057. The return relative address determination unit 1059 determines whether or not a return address of a return instruction is in the address range of the routine of the movement source, with reference to the contents of the routine movement management entry 1057. When the determination result is "Yes", the return relative address correction unit 1058 corrects the return address so that the return instruction returns to the routine of the movement source. The routine 1060, the branch destination management entry 1053, and the routine movement management entry 1057 may exist in the memory.

Figure 11:
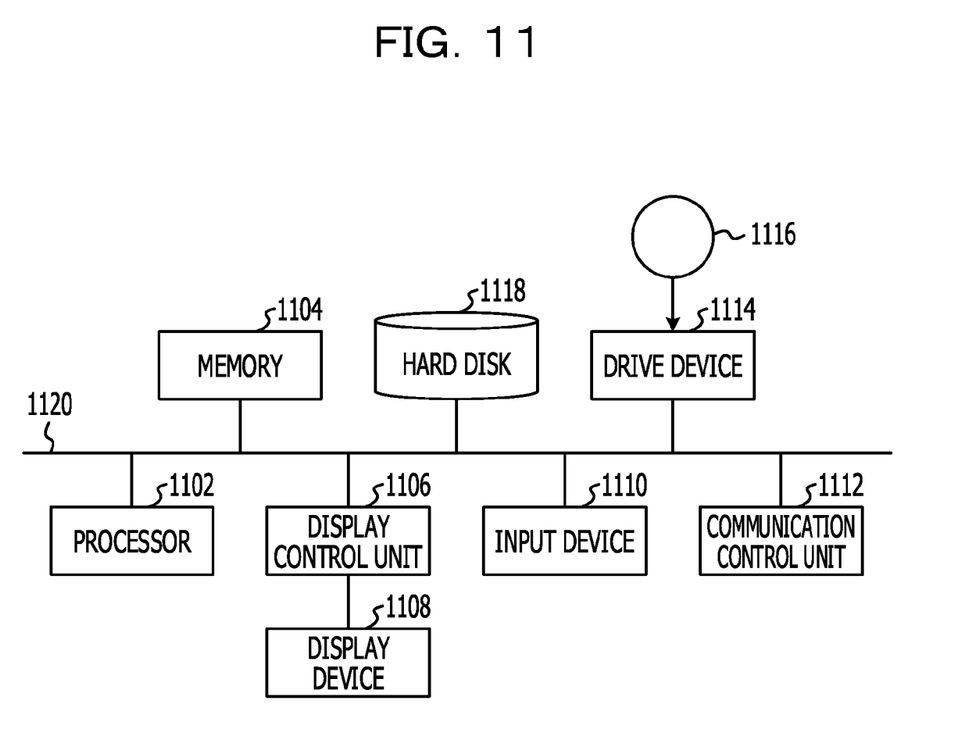
FIG. 11 is a diagram illustrating an example of a hardware configuration according to the embodiment.

FIG. 11 is a diagram illustrating an example of a hardware configuration of the according embodiment. In the embodiment, hardware includes a processor 1102 such as a central processing unit (CPU), a memory 1104 such as a random access memory (RAM), a display control unit 1106 such as a graphic card, a display device 1108, an input device 1110 such as a keyboard and a mouse, a communication control unit 1112 such as a network interface card (NIC), a drive device 1114, and a hard disk 1118. In addition, the pieces of hardware are coupled to each other through a bus 1120. In addition, the drive device 1114 may read from and write to a portable recording medium 1116. In addition, a network (not illustrated) may be coupled to the communication control unit 1112.

The Java VM and the JIT compiler that operates on the Java VM according to the embodiment are stored in the memory 1104, the hard disk 1118, and the like, and operate by the processor 1102. The compiled machine language routine may be arranged on the memory 1104 through a virtual memory architecture.

All or a part of the embodiments are implemented by a program. The program may be stored in the portable recording medium 1116. The portable recording medium 1116 is one or more non-transitory tangible storage mediums each of which has a structure. As the portable recording medium 1116, a magnetic recording medium, an optical disk, an optical magnetic recording medium, a non-volatile memory, and the like may be employed. Examples of the magnetic recording medium include a hard disk drive (HDD), a flexible disk (FD), a magnetic tape (MT). Examples of the optical disk include a digital versatile disc (DVD), a digital versatile disc-read only memory (DVD-RAM), a compact disc-read only memory (CD-ROM), a compact disc recordable (CD-R), a compact disc rewritable (RW). In addition, examples of the optical magnetic recording medium include a magneto-optical disk (MO). The program stored in the portable recording medium is read and executed by the processor, thereby implementing all or a part of the embodiments.

In the embodiments, the case in which an relative address is used for a branch instruction, and alternatively, the embodiments may be applied to a case in which an absolute address is used for the branch instruction. For example, an absolute address may be used for the branch instruction because an absolute address of a branch destination (including a return destination of a return instruction) varies when the branch destination is moved on the memory. It is desirable to execute processes according to the embodiments regarding this aspect. However, the absolute address may not be used for the branch instruction regarding this aspect in some cases because the absolute address of the branch destination (including the return destination of the return instruction) does not vary even when a branch source (including the return instruction) is moved on the memory. Note that it is probable that the above-described two aspects occur at the same time because the routine may be the branch source and also the branch destination when the routine is moved on the memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An address managing method that is implemented by a computer, comprising:
   receiving a branch instruction that is a jump instruction;
   determining whether or not an address of a branch destination associated with the branch instruction is fixed;
   when the address of the branch destination is fixed, setting an operand of the branch instruction as a relative address to an instruction of the branch destination without generating a branch destination management entry and storing a difference between an address in which an instruction of the branch destination is located and an address in which the branch instruction is located in the operand;
   when the address of the branch destination is not fixed, determining whether or not a branch destination management entry exists;
   when the branch destination management entry exists, setting an operand of a machine language of the branch instruction as a relative address to the jump instruction such that the branch instruction may jump to the jump instruction and the branch instruction may proceed to an instruction of a target branch destination through the jump instruction; and
   when the branch destination management entry does not exist, associating information that identifies a branch destination routine of the branch instruction with a jump instruction in which a relative address to the branch destination routine is set as a jump destination, generating the associated information and jump instruction in a new branch destination management entry on a memory,
   setting a relative address to a position of the jump instruction that corresponds to the information that identifies the branch destination routine of the branch instruction, as a branch destination relative address of the branch instruction, and
   changing the jump destination of the jump instruction that corresponds to the information that identifies the branch destination routine, to a relative address to a position of the branch destination routine of the movement destination, with reference to the new branch destination management entry when the branch destination routine is moved.

2. The address managing method according to claim 1, further comprising:
   changing the branch destination relative address of the branch instruction to the relative address to the position of the jump instruction that corresponds to the information that identifies the branch destination routine of the branch instruction when the branch instruction is moved.

3. The address managing method according to claim 1, further comprising:
   changing based on a certain offset a return relative address of a return instruction in a case in which the branch instruction is a call instruction, when an instruction that is located in the return relative address of the return instruction that corresponds to the call instruction is moved by the certain offset before the return instruction is executed after the call instruction is executed.

4. The address managing method according to claim 3, further comprising:
   storing a range of an address of the routine of the movement source in the memory, and
   determining whether or not the return relative address before the changing is within the stored range of the address of the routine of the movement source.

5. An apparatus comprising:
   a memory; and
   a processor coupled to the memory and configured to:
      receiving a branch instruction that is a jump instruction;
      determine whether or not an address of a branch destination associated with the branch instruction is fixed;
      when the address of the branch destination is fixed, set an operand of the branch instruction as a relative address to an instruction of the branch destination without generating a branch destination management entry and store a difference between an address in which an instruction of the branch destination is located and an address in which the branch instruction is located in the operand;
      when the address of the branch destination is not fixed, determine whether or not a branch destination management entry exists;
      when the branch destination management entry exists, set an operand of a machine language of the branch instruction as a relative address to the jump instruction such that the branch instruction may jump to the jump instruction and the branch instruction may proceed to an instruction of a target branch destination through the jump instruction; and
      when the branch destination management entry does not exist, associate information that identifies a branch destination routine of the branch instruction with a jump instruction in which a relative address to the branch destination routine is set as a jump destination, generate the associated information and jump instruction in a new branch destination management entry on a memory,
      set a relative address to a position of the jump instruction that corresponds to the information that identifies the branch destination routine of the branch instruction, as a branch destination relative address of the branch instruction, and
      change the jump destination of the jump instruction that corresponds to the information that identifies the branch destination routine, to a relative address to a position of the branch destination routine of the movement destination, with reference to the new branch destination management entry when the branch destination routine is moved.

6. The apparatus according to claim 5, wherein
the processor is further configured to change the branch destination relative address of the branch instruction to the relative address to the position of the jump instruction that corresponds to the information that identifies the branch destination routine of the branch instruction when the branch instruction is moved.

7. The apparatus according to claim 5, wherein
in a case in which the branch instruction is a call instruction, when an instruction that is located in a return relative address of a return instruction that corresponds to the call instruction is moved by a certain offset before the return instruction is executed after the call instruction is executed, the processor is further configured to change the return relative address of the return instruction based on the certain offset.

8. The apparatus according to claim 7, wherein
the processor is further configured to store a range of an address of the routine of the movement source in the memory, and determine whether or not the return relative address before changing is within the stored range of the address of the routine of the movement source.

9. A non-transitory computer-readable recording medium storing a program for causing an apparatus to execute an address managing process, the address managing process comprising:
receiving a branch instruction that is a jump instruction;
determining whether or not an address of a branch destination associated with the branch instruction is fixed;
when the address of the branch destination is fixed, setting an operand of the branch instruction as a relative address to an instruction of the branch destination without generating a branch destination management entry, a difference between an address in which an instruction of the branch destination is located and an address in which the branch instruction is located being stored in the operand;
when the address of the branch destination is not fixed, determining whether or not a branch destination management entry exists;
when the branch destination management entry exists, setting an operand of a machine language of the branch instruction as a relative address to the jump instruction such that the branch instruction may jump to the jump instruction and the branch instruction may proceed to an instruction of a target branch destination through the lump instruction; and
when the branch destination management entry does not exist, associating information that identifies a branch destination routine of the branch instruction with a jump instruction in which a relative address to the branch destination routine is set as a jump destination, generating the associated information and jump instruction in a new branch destination management entry on a memory,
setting a relative address to a position of the jump instruction that corresponds to the information that identifies the branch destination routine of the branch instruction, as a branch destination relative address of the branch instruction, and
changing the jump destination of the jump instruction that corresponds to the information that identifies the branch destination routine, to a relative address to a position of the branch destination routine of the movement destination, with reference to the new branch destination management entry when the branch destination routine is moved.

10. The non-transitory computer-readable recording medium according to claim 9, the address managing process further comprising:
changing the branch destination relative address of the branch instruction to the relative address to the position of the jump instruction that corresponds to the information that identifies the branch destination routine of the branch instruction when the branch instruction is moved.

11. The non-transitory computer-readable recording medium according to claim 9, the address managing process further comprising:
changing based on a certain offset a return relative address of a return instruction in a case in which the branch instruction is a call instruction, when an instruction that is located in the return relative address of the return instruction that corresponds to the call instruction is moved by the certain offset before the return instruction is executed after the call instruction is executed.

12. The non-transitory computer-readable recording medium according to claim 11, the address managing process further comprising:
storing a range of an address of the routine of the movement source in the memory, and
determining whether or not the return relative address before the changing is within the stored range of the address of the routine of the movement source.

* * * * *